United States Patent
Kitakaze

(10) Patent No.: US 6,656,350 B2
(45) Date of Patent: Dec. 2, 2003

(54) WATER PURIFYING CARTRIDGE FOR EMPTY POLYETHYLENE TEREPHTHALATE OR PET BOTTLE

(75) Inventor: Hiromichi Kitakaze, Taito-ku (JP)

(73) Assignee: Kitakaze Corporation, Tokyo (JP)

( * ) Notice: Subject to any disclaimer, the term of this patent is extended or adjusted under 35 U.S.C. 154(b) by 26 days.

(21) Appl. No.: 09/810,185

(22) Filed: Mar. 19, 2001

(65) Prior Publication Data

US 2002/0070154 A1 Jun. 13, 2002

(30) Foreign Application Priority Data

Dec. 12, 2000 (JP) ...................................... 2000-377411

(51) Int. Cl.[7] .......................... B01D 21/30; B01D 27/02
(52) U.S. Cl. ...................... 210/136; 210/232; 210/238; 210/266; 210/282; 210/419
(58) Field of Search ................ 210/266, 238, 210/282, 136, 419, 232

(56) References Cited

U.S. PATENT DOCUMENTS

| | | | | |
|---|---|---|---|---|
| 4,807,567 A | * | 2/1989 | Atchley | 119/477 |
| D329,724 S | * | 9/1992 | Singh et al. | D30/132 |
| 5,730,082 A | * | 3/1998 | Newman | 119/51.5 |
| D397,531 S | * | 8/1998 | Huff | D30/119 |
| 5,840,185 A | * | 11/1998 | Hughes et al. | 210/232 |
| 5,914,045 A | * | 6/1999 | Palmer et al. | 210/136 |
| 5,919,365 A | * | 7/1999 | Collette | 210/419 |
| 5,928,512 A | * | 7/1999 | Hatch et al. | 210/266 |
| 5,960,742 A | * | 10/1999 | O'Rourke et al. | 119/74 |
| 6,101,974 A | * | 8/2000 | Frohlich | 119/51.5 |
| 6,136,189 A | * | 10/2000 | Smith et al. | 210/266 |
| 6,153,096 A | * | 11/2000 | Nonren, Jr. | 210/238 |
| 6,165,362 A | * | 12/2000 | Nohren, Jr. et al. | 210/266 |
| 6,193,886 B1 | * | 2/2001 | Nohren, Jr. | 210/282 |
| 6,200,471 B1 | * | 3/2001 | Nohren, Jr. | 210/184 |
| 6,221,416 B1 | * | 4/2001 | Nohren, Jr. | 210/266 |
| 6,234,862 B1 | * | 5/2001 | Wittenberg | 446/305 |
| 6,277,284 B1 | * | 8/2001 | Nohren | 210/282 |
| 6,293,226 B1 | * | 9/2001 | Hwang | 119/72 |
| 2002/0088745 A1 | * | 7/2002 | Barlow | 210/266 |

FOREIGN PATENT DOCUMENTS

| | | | | |
|---|---|---|---|---|
| JP | 08252486 A | * | 10/1996 | B05B/1/00 |
| JP | 09024365 A | * | 1/1997 | C02F/1/28 |
| JP | 11077026 A | * | 3/1999 | C02F/1/28 |

OTHER PUBLICATIONS

Grant & Hackh's Chemical Dictionary, 5th ed., McGraw–Hill, 1987, entry for "PET" at p. 435 showing that correct spelling of "terephthalate" is not "terapthalate." *

* cited by examiner

Primary Examiner—Chester T. Barry
(74) Attorney, Agent, or Firm—Oblon, Spivak, McClelland, Maier & Neustadt, P.C.

(57) ABSTRACT

A water purifying cartridge, attached to an empty polyethylene terephthalate or PET bottle integrally formed with a seat member, including: a flange member having substantially the same diameter as an outer shape of a spout of the bottle and a thickness portion screwed to water-tightly fit an inner portion of a screw cap of the bottle; a water charging/discharging mouth portion opened to a substantially central portion of the flange member; a hollow neck portion inserted inside of the spout of the bottle adjacent to the flange member and having projected portions; a filter portion under the neck portion; an extractable/contractable adjusting portion adjacent to the filter portion; a cylindrical portion adjacent to the adjusting portion; and a water purifying portion having an outer periphery with clearances for passing water therethrough. The adjusting portion, the cylindrical portion and the water purifying portion all containing water purifying agents.

5 Claims, 6 Drawing Sheets

WATER PURIFYING CARTRIDGE FOR EMPTY POLYETHYLENE TEREPHTHALATE OR PET BOTTLE

BACKGROUND OF THE INVENTION

1. Field of the Invention

The present invention relates to a water purifying cartridge for an empty polyethylene terephthalate or PET bottle, wherein the water purifying cartridge is attached to an inside of the empty polyethylene terephthalate or PET bottle of a polyethylene terephthalate or PET bottle container which was originally on sale, but which has had the contents thereof consumed, and which has had tap water or the like put into the inside of the polyethylene terephthalate or PET bottle so that the water purifying cartridge enables the removal of bleaching powder, oxidation and reduction, ion exchange, and similar of the tap water put into the empty polyethylene terephthalate or PET bottle.

2. Discussion of Background

Conventionally, a water purifying cartridge of this kind has been proposed in Japanese Patent Laid-Open No. 77026/1199 (hereinafter "JP'026") in which an invention entitled "Water Storing Type Water Purifier Used By Attaching To Bottle Container" was disclosed.

FIG. 6 is an outline view of mounting a water storing type water purifier, as disclosed in JP '026, onto a bottle container, and FIG. 7 is a sectional view of a cap portion 102 of the water storing type water purifier shown in FIG. 6.

In FIGS. 6 and 7, numeral 101 designates a neck portion of the water purifier, numeral 102 designates the cap portion, numeral 103 designates a water inlet thereof, numeral 104 designates a connecting portion thereof, numeral 105 designates an adsorbing and filtering material portion, numeral 107 designates a cap of a bottle container, numeral 108 designates the bottle container, and numeral 109 designates a spout of the bottle container 108 which is omitted in FIG. 6. A fitting portion of the cap portion 102 is formed with a thread portion 106 and a fitting portion of the cap 107 of the bottle container 108 is pivotally attached to the thread portion 106 at an upper outer portion of the bottle container 108. At inside of the bottle container 108, a fitting portion is arranged so as to be screwed to fit to the spout 109 of the bottle container 108 via a spout seal 110 which is brought into close contact with the spout 109 of the bottle container 108.

The water storing type water purifier, as disclosed in JP '026 which is mentioned above and which is used by attaching a bottle container to the water purifier, has a problem as follows. The water purifier has a constitution which is constructed so that a front end of the neck portion 101 of the water purifier is screwed to fit to the cap 107, inherently provided to the bottle container 108, and a middle portion thereof is screwed to fit to the spout 109 of the bottle container 108 and therefore, the constitution is weak in strength. Further, a gap is formed in the screw structure into which the spout 109 of the bottle container 108 is inserted. This causes the concern of attaching dirt to the portion and generating fur or mold to the dirt which is problematic in view of hygiene.

Further, the bottle container 108 and the water purifier are constituted to fixedly attach to each other such that the water purifier is screwed to fit to the thread portion of the spout 109 of the bottle container 108 and therefore, there is a problem that the structure becomes complicated, fabrication thereof is difficult and an increase in the cost is unavoidable. Further, according to the polyethylene terephthalate or PET bottle container 108 of recent times, in view of hygiene, or in view of a danger of mixing a dangerous matter, as shown by FIG. 8, the cap 107, before unsealing, is frequently formed integrally with a seat member 111 that is formed at a lower portion of the screw structure or thread portion 106 of the spout 109. When the conventional water purifier of this kind is intended to be attached to the polyethylene terephthalate or PET bottle container 108 of this type, the water purifier cannot be attached thereto unless the seat member 111 is cut by a nipper, a pinch device, a scissors, or similar and there is a problem that the water purifier cannot simply be attached to empty polyethylene terephthalate or PET bottles which are generally on sale and distributed in a large number.

SUMMARY OF THE INVENTION

The present invention has been devised in order to resolve the above-described problem and according to a first aspect of the present invention, there is provided a water purifying cartridge for an empty polyethylene terephthalate or PET bottle comprising a flange member having a diameter substantially the same as an outer shape of a spout of an empty bottle, the flange member having a thickness portion screwed to fit, in a water-tight manner, to an inner portion of a screw cap, when the screw cap, inherently provided to the empty polyethylene terephthalate or PET bottle, is fitted to a thread portion of the empty polyethylene terephthalate or PET bottle. The water purifying cartridge also including a water charging and discharging mouth portion opened to a substantially central portion of the flange member, a hollow neck portion inserted to an inside of the spout of the polyethylene terephthalate or PET bottle successive to the flange member, the hollow neck portion having projected portions in a shape of a cross or a shape of a line brought into close contact with an inner diameter of the spout by a predetermined length, a filter portion arranged right under the neck portion, an extractable and contractable adjusting portion filled with one or two kinds or more of water purifying agents successive to the filter portion, a cylindrical portion filled with one or two kinds or more of water purifying agents successive to the adjusting portion, and a water purifying portion which is filled with one or two kinds or more of water purifying agents and which has an outer periphery provided with meshes or clearances for passing water therethrough.

Further, according to a second aspect of the present invention, there is provided the water purifying cartridge for an empty polyethylene terephthalate or PET bottle according to the first aspect of the present invention, wherein the water purifying cartridge for the empty polyethylene terephthalate or PET bottle is attached thereto by providing a packing member which is fitted, in a water-tight manner, to an inner diameter portion of the spout of the empty polyethylene terephthalate or PET bottle substantially in the same shape and an inner portion of which is fitted with a main body of the water purifying cartridge to the spout of the empty polyethylene terephthalate or PET bottle.

Further, according to a third aspect of the present invention, there is provided the water purifying cartridge for an empty polyethylene terephthalate or PET bottle according to the first aspect of the present invention, wherein the adjusting portion, the cylindrical portion and the water purifying portion are respectively removable and the water purifying agents filled to inner portions thereof are formed exchangeably.

Further, according to a fourth aspect of the present invention, there is provided the water purifying cartridge for an empty polyethylene terephthalate or PET bottle according to the third aspect of the present invention, wherein a lower portion of the water purifying portion is formed by a removable lid structure for exchanging the water purifying agents.

Further, according to a fifth aspect of the present invention, there is provided the water purifying cartridge for an empty polyethylene terephthalate or PET bottle according to the first aspect of the present invention, wherein the adjusting portion filled with the water purifying agents, the cylindrical portion filled with the water purifying agents and the water purifying portion an outer periphery of which is provided with the meshes or the clearances for passing water therethrough, are constituted exchangeably in a state respectively filled with the water purifying agents.

BRIEF DESCRIPTION OF THE DRAWING FIGURES

DETAILED DESCRIPTION OF THE PREFERRED EMBODIMENTS

Figure 1:
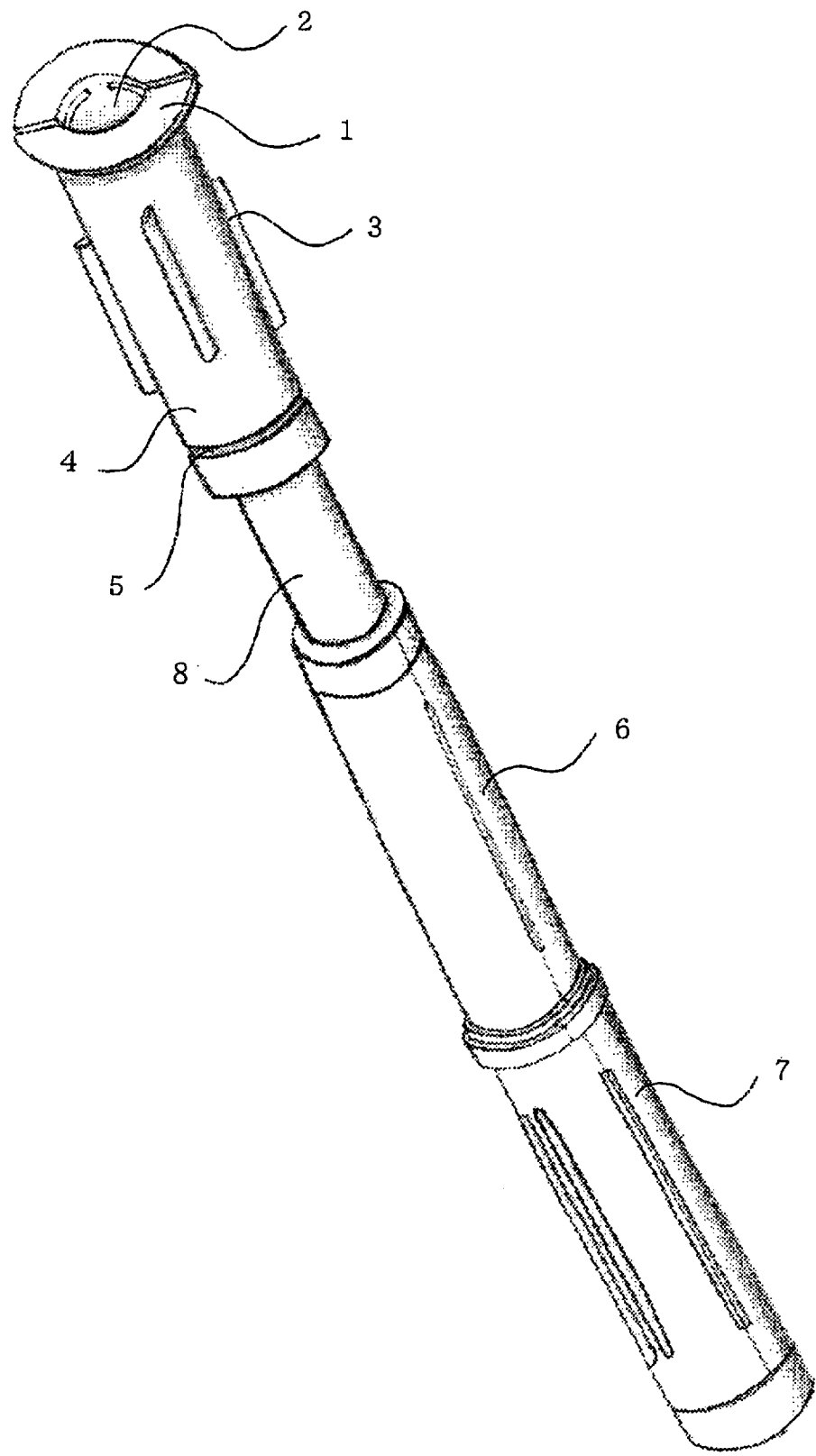
FIG. 1 is a view showing an outline of a water purifying cartridge for an empty polyethylene terephthalate or PET bottle according to a first embodiment in embodiments of the present invention related to a first through a fifth aspect of the application.

A detailed explanation will be given of an embodiment of the present according to a first through a fifth aspect of the application in reference to the drawing figures.

FIG. 1 is a view showing an outline of a water purifying cartridge for an empty polyethylene terephthalate or PET bottle according to a first embodiment of the present invention, which is related to the first through the fifth aspects of the application. According to the first embodiment, the outline of the water purifying cartridge shown in FIG. 1 is used on a large (2 liter or 1.5 liter) polyethylene terephthalate or PET bottle which was originally on sale.

In the drawing figures, notation 1 designates a flange member having a diameter substantially equal to an outer shape of a spout of an empty polyethylene terephthalate or PET bottle, and having a thickness portion which is screwed to fit, in a water-tight manner, to an inside of a screw cap, when the screw cap, inherently provided to the empty polyethylene terephthalate or PET bottle, is fitted to a thread portion of the empty polyethylene terephthalate or PET bottle, notation 2 designates a water charging and discharging mouth portion opened to a substantially central portion of the flange member, notation 3 designates projected portions in a shape of a cross or a line inserted into a spout of the empty polyethylene terephthalate or PET bottle successive to the flange member, which are brought into close contact with an inner diameter of the spout by a predetermined length, notation 4 designates a hollow neck portion having the projected portions, notation 5 designates a filter portion arranged right under the neck portion, notation 6 designates a cylindrical portion filled with one or two kinds or more of water purifying agents, notation 7 designates a water purifying portion filled with one or two kinds or more of water purifying agents and having meshes or clearance for passing water therethrough at an outer periphery thereof, and notation 8 designates an extractable and contractable adjusting portion filled with one or two kinds or more of water purifying agents successive to the filter portion.

The flange member 1, formed in an outer size of the spout of the bottle, is provided with a thickness portion screwed to fit, in a water-tight manner, to an inside of the cap, when the screw cap, inherently provided to the empty polyethylene terephthalate or PET bottle, is fitted to the thread portion of the polyethylene terephthalate or PET bottle. Specifically, the flange member 1 is provided with the thickness portion of about 1 mm to 2 mm. Further, according to a spout of a polyethylene terephthalate or PET bottle of 1.5 liter, for example, a spout of a polyethylene terephthalate or PET bottle on sale from Japan Coca Cola Co., Ltd., an outer shape thereof is 24 mm, an inner diameter thereof is 22 mm, a thickness thereof is 1 mm, and a depth thereof is 22 mm. According to a spout of a polyethylene terephthalate or PET bottle of a 2 liter type, for example, a spout of a polyethylene terephthalate or PET bottle on sale from Asahi Drinks Co., Ltd., an outer shape thereof is 24 mm, an inner diameter thereof is 22 mm, a thickness thereof is 2 mm, and a depth thereof is 19 mm. Therefore, the outer diameter of the flange member may be the outer shape of 24 mm and a size and a thickness thereof may not be so strict dimensions even when there is more or less error so far as the cap is fitted to the flange member and water-tightness is ensured.

Further, there is arranged a packing member, a portion of which is inserted into the spout of the empty polyethylene terephthalate or PET bottle, and which is formed in a water-tight manner, between the flange member 1 and the spout of the empty polyethylene terephthalate or PET bottle so that the packing member is formed to prevent water leakage from a clearance between the flange member 1 and the spout of the polyethylene terephthalate or PET bottle.

Figure 2:
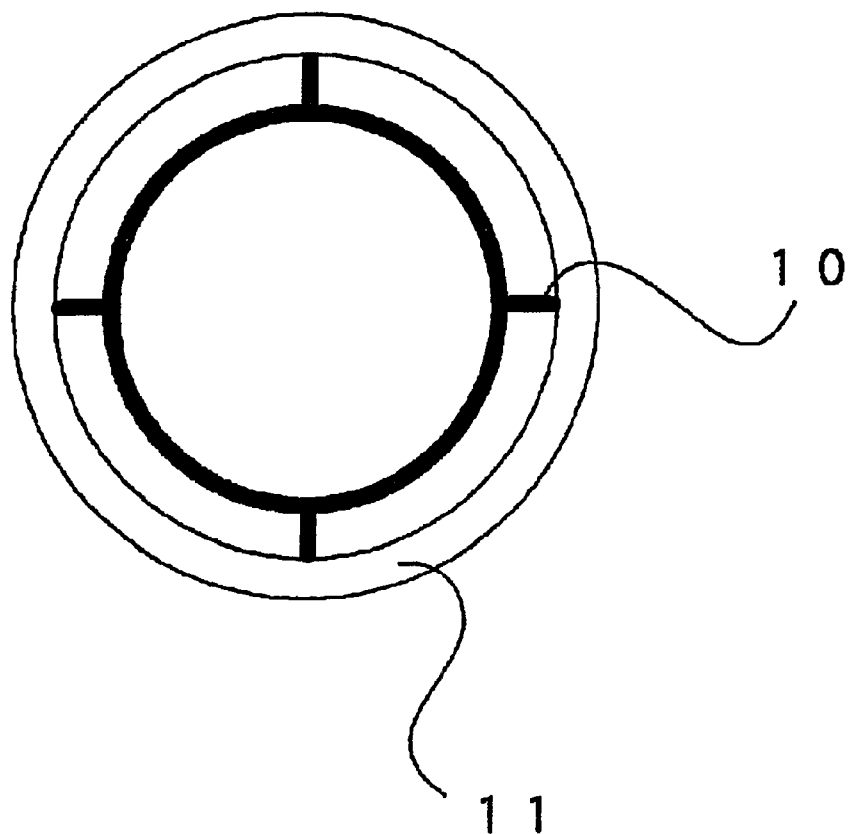
FIG. 2 is a sectional view showing an outline constitution of a hollow neck portion having projected portions in a shape of a cross of the water purifying cartridge for an empty polyethylene terephthalate or PET bottle according to the first embodiment.

Further, as shown by FIG. 2, at a substantially central portion of the flange member 1, there is formed a water charging and discharging mouth portion 2 for injecting tap water or similar into the polyethylene terephthalate or PET bottle and discharging the water in drinking thereof. Further, successive to the flange member 1, there is provided the hollow neck portion 4 having the projected portions 3 in a shape of a cross or a shape of a line which is inserted into the spout of the empty polyethylene terephthalate or PET bottle and is brought into close contact with the inner diameter of the spout by a predetermined length. FIG. 2 is a view showing an outline constitution of the hollow neck portion 4 having the projected portions 3 in the shape of the cross.

That is, as shown by FIG. 2, in the case of the water purifying cartridge for the empty polyethylene terephthalate or PET bottle according to the embodiment, there is formed an outer peripheral flow path for supporting the cartridge in the polyethylene terephthalate or PET bottle between a spout of the cartridge and a spout 11 of the empty polyethylene terephthalate or PET bottle by the projected portions 10 and facilitating flow of tap water or similar coming into and going out from the polyethylene terephthalate or PET bottle by a clearance formed at the surrounding. By partitioning the flow path in this way, for example, in flowing in water, when water is flowed in from the center, air is discharged from an outer side thereof, further, in taking out water from the bottle, water is discharged from the outer peripheral flow path, air is flowed in from an upper opposed side thereof and accordingly, water is flowed in an flowed out smoothly.

Further, the cartridge is provided with the filter portion 5 arranged right under the neck portion 4 for preventing foreign matter, impurity or similar from mixing into an inside thereof.

Further, one or two kinds or more of water purifier agents are filled to each of the adjusting portion, the cylindrical portion and the water purifying portion successive to the filter portion. Further, the cylindrical portion 6 and the water purifying portion 7 and the adjusting portion 8 are respectively removable. Therefore, one or two kinds or more of water purifying agents filled thereinto are also exchangeable. Thereby, only the water purifying agents can be exchanged, it is not necessary to buy members constituting the cylindrical portion 6 and the water purifying portion 7 and the adjusting portion 8 and therefore, the water purifying agents can be exchanged in accordance with contamination thereof.

Further, since there is constructed a constitution having a number of removable portions, a cleanable range is widened and fur or dirt is prevented from adhering, which is effective in view of hygiene. Further, also in view of waste treatment problem which is regarded as problematic at present, the constitution effectively amounts to a reduction in incombustible waste. Next, an explanation will be given of materials of the water purifying agents of the cartridge and arrangement thereof.

Figure 3:
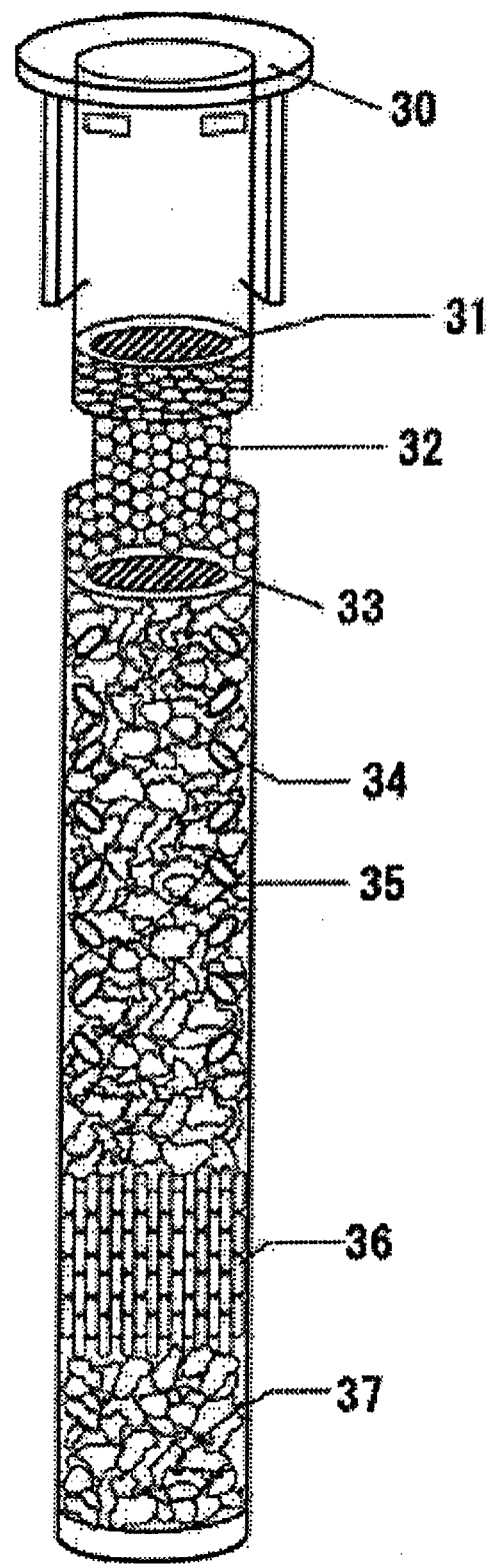
FIG. 3 is an outline view showing materials of water purifying members and an example of arranging thereof in the water purifying cartridge for an empty polyethylene terephthalate or PET bottle.

FIG. 3 is an outline view showing materials of water purifying agents of a water purifying cartridge for an empty polyethylene terephthalate or PET bottle. In the drawing, numeral 30 designates a member the same as that explained as the flange member 1, which is constituted such that a diameter thereof is substantially the same as the outer shape of the spout of the empty polyethylene terephthalate or PET bottle. Further, there is formed a thickness portion by which, even when the screw cap, inherently provided to the empty polyethylene terephthalate or PET bottle, is filled to the thread portion of the empty polyethylene terephthalate or PET bottle, the flange member is inclusively screwed to fit thereto in a water-tight manner. Further, numeral 31 designates a member the same as that explained as the filter portion 5, which is arranged right under the neck portion 4. Numeral 32 designates dechlorinating ceramic balls, numeral 33 designates a filter portion for dividing the dechlorinating ceramic balls and the kaiseki 34 arranged therebelow, below which there are successively arranged iouseki 35, antibacterial activated carbon 36, and biological mineral ceramics 37.

The dechlorinating ceramic ball 32 is provided with a biscuit structure for removing instantaneously bleaching powder smell (free chlorine smell) by utilizing chemical reaction. When compared with activated carbon generally and frequently utilized as a dechlorinating agent of this kind, activated carbon removes the bleaching powder smell by utilizing adsorption reaction and accordingly, a long period of time is required in removing thereof, in contrast thereto, in the case of the dechlorinating ceramic balls 32, a short period of time is required therefor and a small area is required therefor in comparison with activated carbon requiring a wide adhering area.

Further, kaiseki 34 is a general mineral stone eluted from the Paleozoic layer, further, iouseki 35 is famous as a medical stone and the two stones elute minerals, are porous, and provided with strong adsorption force and ion exchange function and provided with an effect of removing bleaching powder smell, adsorbing and removing poisonous organic compounds and, at a same time, carrying out ion exchange in an alkaline direction with respect to pH of water. That is, minerals are added further to mineral portions of tap water and activated water good for human body can be finished.

Therefore, here, there are carried out removing poisonous organic compounds or metal ions, achieving antibacterial power and strong reduction power, deodorant action, adding alkaline degree of pH by ion exchange and adding minerals by elution. Further, the antibacterial activated carbon 36 is porous, provided with a wide surface area of 1000 meter square per gram and there is carried out highly functional impurity removal utilizing the wide area. Further, there also is provided an effect of reducing bleaching powder smell or mold smell as less as possible and adsorbing and removing environmental hormone (bisphenol A, nonylphenol) currently posing a problem.

Further, the biological mineral ceramics 37 is blended with biological mineral components extracted from 50 kinds or more of wild grass, sea weed, leaves of trees and so on and by only touching water thereby, the water is denatured to water having high oxidation and reduction power provided with life energy and resonant wave of wild plants and generally, the water is referred to as biologically balanced water.

Further, by constructing such an arrangement constitution, water inputted and flowed from above is subjected to a first stage of impurity removal at the filter portion 31, successively, water which has passed through the filter portion 31 is removed of bleaching powder smell by the dechlorinating ceramic ball 32 and subjected to a second stage of impurity removal by the filter portion 33 arranged therebelow. Further, water brought to the lower portion is added with minerals by the kaiseki 34 and the iouseki 35, successively, subjected to propagation restraint of various bacteria and deodorization in passing through the antibacterial activated carbon 36 and finally added with biological minerals by the biological mineral ceramic 37.

The arrangement is pointed out simply as an example, even when the alignment differs, there is not caused a difference in operation and effect of the present invention and the invention is not limited to the arrangement. Further, the various kinds of water purifying agents are not limited to the materials but even different substances can pertinently be selected and used so far as the substances are provided with water purifying operation.

Further, when the water purifying cartridge according to the embodiment is utilized for an empty polyethylene terephthalate or PET bottle of a small bottle type, the constitution is similar to the water purifying cartridge according to the first embodiment in that by utilizing the screw cap inherently provided to the empty polyethylene terephthalate or PET bottle, the cartridge is fitted to a thread portion of the empty polyethylene terephthalate or PET bottle and is screwed to fit, in a water-tight manner, to an inside of the cap and accordingly, the basic constitution substantially remains unchanged from that shown in the above-described first embodiment.

However, the empty polyethylene terephthalate or PET bottle of the small bottle type differs from the polyethylene terephthalate or PET bottle of a large bottle type in a diameter and a thickness of the flange and a size of the projected portion and therefore, it is necessary to correspond to the diameter and the thickness of the flange and size of the projected portion. Further, in comparison with the water purifying cartridge according to the first embodiment, a length of a total thereof must be short. According to a spout of a polyethylene terephthalate or PET bottle of 500 milliliter of a small bottle type, for example, a spout of a polyethylene terephthalate or PET bottle of 500 milliliter distributed from Otsuka Seiyaku Co., Ltd., the outer shape is 24 mm, the inner diameter is 20 mm, the thickness is 2 mm, and the depth is 23 mm.

Other than thereof, according to a spout of a polyethylene terephthalate or PET bottle of 500 milliliter distributed from Suntory Co., Ltd., the outer shape is 24 mm, the inner diameter is 20 mm, the thickness is 2 mm, and the depth is 22 mm. Further, according to a spout of a polyethylene terephthalate or PET bottle of 500 milliliter distributed from Kirin Beverage Co., Ltd., the outer shape is 24 mm, the inner diameter is 22 mm, the thickness is 1 mm, and the depth is 22 mm and accordingly, the outer diameter of the flange member 1 must correspond to the outer shape of 24 mm. Further, the thickness of the flange member 1 may be a thickness ensuring water-tightness at a depth of a spout cap of the polyethylene terephthalate or PET bottle, specifically, about 1 mm to 2 mm and the size and thickness may not be so strict dimensions even when there is more or less error, so far as the cap is fitted and the water-tightness is ensured.

Further, a total length of the water purifying cartridge of this type is formed to be short in comparison with the vertical length of the water purifying cartridge for a polyethylene terephthalate or PET bottle of the large bottle type according to the first embodiment, mentioned above, in correspondence with the total length of the polyethylene terephthalate or PET bottle of the small bottle type.

Further, although an explanation has been given of forming the cartridge in which the diameter and thickness of the flange and the size of the projected portion or the total length are adapted to hose of the small bottle type for being used for the small bottle type, as mentioned above, the cartridge of the small bottle type is provided with the basic constitution the same as that in the first embodiment and therefore, basically, there is used the water purifying cartridge according to the first embodiment and only different members, for example, the flange member 1 and the hollow neck portion 4 and the projected portions 3 may be exchanged by members adapted to the dimensions of the polyethylene terephthalate or PET bottle type for small bottle and a length of the adjusting portion 8 may be adjusted to correspond to the small bottle use. The adjusting portion 8 is provided with the function extractable and contractable with regard to the vertical direction of the empty polyethylene terephthalate or PET bottle and accordingly, when used in the empty polyethylene terephthalate or PET bottle of the small bottle type, the vertical length is contracted to be short.

Figure 4:
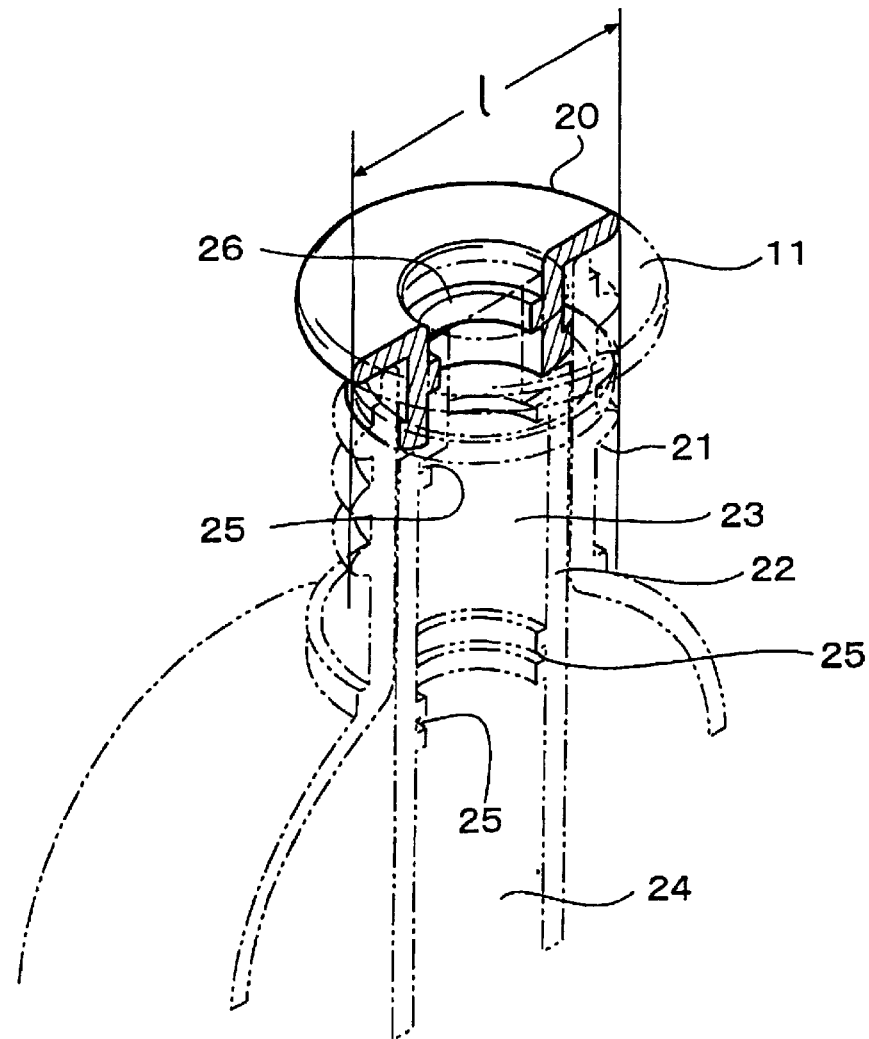
FIG. 4 is a view showing an example of an embodiment of the present invention using a packing member 20 of an inserting and tight contacting type at a spout of an empty polyethylene terephthalate or PET bottle.
Figure 5:
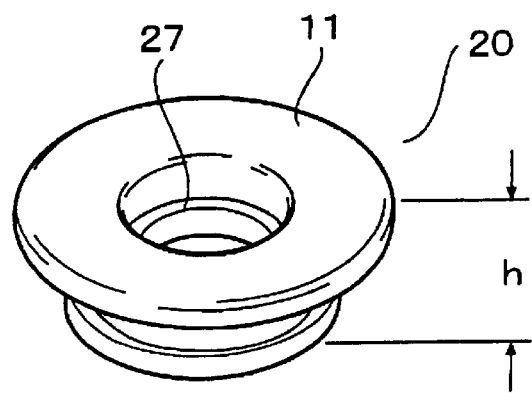
FIG. 5 is an outline view of an outer shape of the packing member 20.
Figure 6:
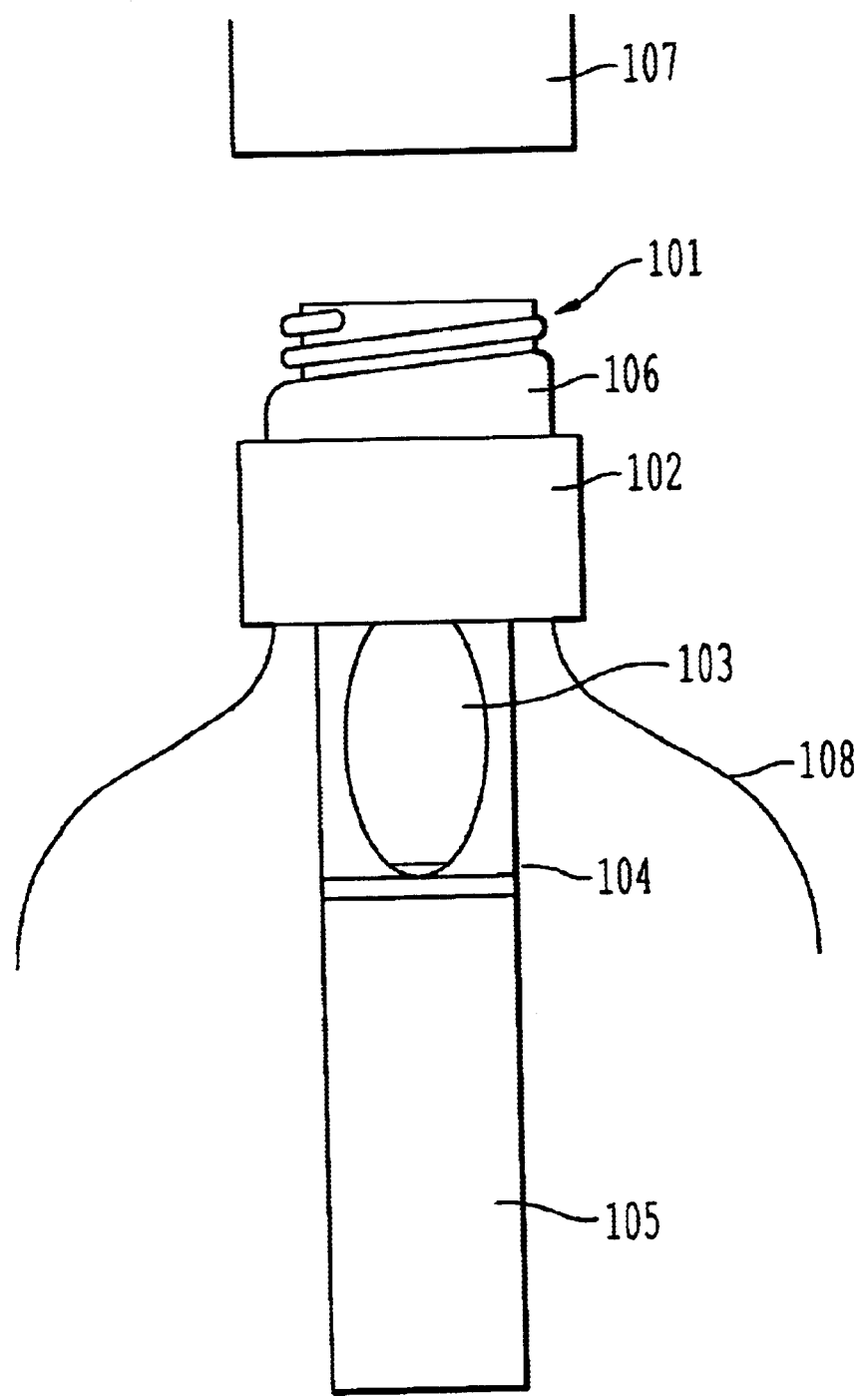
FIG. 6 is an outline view of mounting a conventional water storing type water purifier, similar to the one shown in JP '026, onto bottle container.
Figure 7:
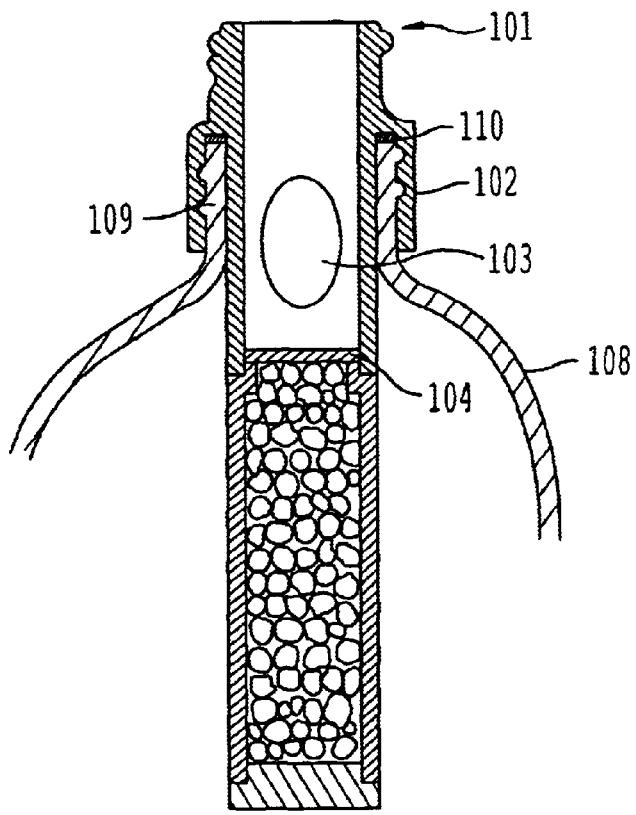
FIG. 7 is a sectional view of FIG. 6's conventional water storing type water purifier, which is similar to the one shown in JP '026, and which has been mounted onto a bottle container.
Figure 8:
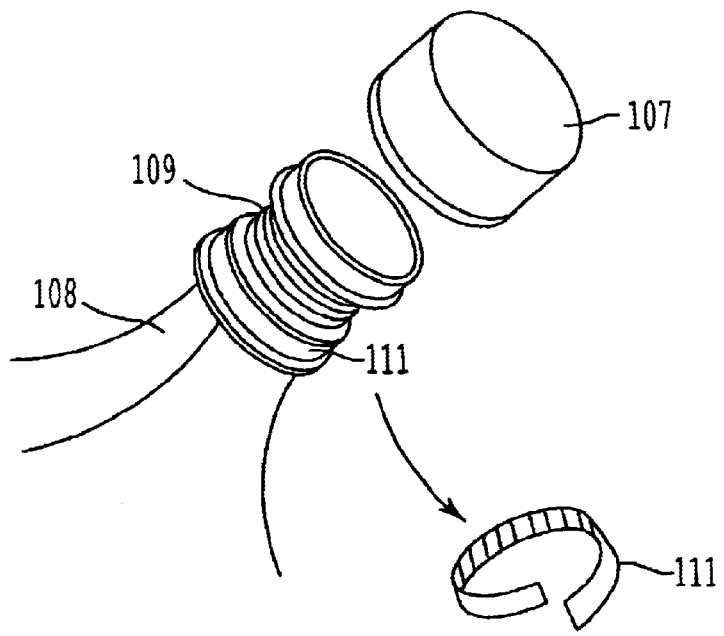
FIG. 8 is a view showing that in an empty polyethylene terephthalate or PET bottle having a seat member of a cap, the seat member needs to be cut.

Further, although the water purifying cartridge according to the first or the second embodiment, is constituted by the flange member 1, the water charging and discharging mouth portion 2, the hollow neck portion 4 and so on, as shown by FIG. 5, there may be provided a packing member 20 in order to promote close contact between the spout of the empty polyethylene terephthalate or PET bottle and the water purifying cartridge according to the embodiment. FIG. 4 is a view showing an embodiment of the present invention using the packing member 20 of a type inserted and brought into close contact with a spout of a polyethylene terephthalate or PET bottle and FIG. 5 is a view showing an outline of an outer shape of the packing member 20. In FIGS. 4 and 5, notation 20 designates the packing member for bringing the spout of the polyethylene terephthalate or PET bottle and the cartridge into close contact with each other, notation 21 designates an empty polyethylene terephthalate or PET bottle container, notation 22 designates a main body of the water purifying cartridge, notations 23 and 24 designate portions of filling the water purifying agents, and notation 25 designates a filter portion.

As shown by FIG. 5, the packing member 20 is constituted by an outer shape having a flange member 11 capable of ensuring water-tightness and having a diameter of "l" and contained in the cap even when the cap (not illustrated), inherently provided to the empty polyethylene terephthalate or PET bottle, is mounted thereon and material thereof is constituted by a member which is provided with elasticity and deformability, such as a silicone member or a rubber member. By being constituted in this way, when inserted into the spout of the empty polyethylene terephthalate or PET bottle, the packing member 20 is brought into close contact with the inner portion, is difficult to detach, and firmly supports the water purifying cartridge main body 22 at the inner portion. Therefore, although height "h" thereof is not restricted, the packing member 20 is provided with a pertinent height length, further, projected to an inner side direction, is provided with an annular projection 27 projected in an inner side direction and fitted to an inside of a clearance portion 26 provided at a predetermined neck position of the water purifying cartridge and firmly supports the water purifying cartridge 22.

Further, the packing member 20 is provided with the flange member 11 having the diameter of "l" covering the spout of the polyethylene terephthalate or PET bottle and completely contained in the inner portion even when the cap is mounted, as described above, similar to the water purifying cartridge 22 according to the first embodiment.

Further, although according to the embodiment, there is constructed a constitution that a front end of the water purifying cartridge 22 does not reach the surface of the flange member 11 of the packing member 20, the front end may pertinently reach the surface. Further, although according to embodiment, the packing member 20 is constituted by a silicone member or a rubber member, any material can be used so far as the packing member is brought into close contact with the inner diameter portion of the spout of the polyethylene terephthalate or PET bottle according to the present invention when inserted thereinto.

That is, when the screw cap inherently provided to the empty polyethylene terephthalate or PET bottle is fitted to the thread portion of the empty polyethylene terephthalate or PET bottle, the screw cap is screwed to fit thereto by covering the flange member 1 and therefore, when the material of the packing member is a deformable member having elasticity, such as a silicone member or a rubber member, any material can be used for the packing member so far as highly close adherence is made possible.

Further, the packing diameter is formed such that the diameter is substantially the same as the outer shape of the spout of the empty polyethylene terephthalate or PET bottle and a water charging and discharging mouth portion thereof, opened to a substantially central portion of the flange member, is constituted similar to the case of the first embodiment.

Further, the water purifying portion 7 may be constructed by a constitution of a lid structure to be capable of detaching to be able to exchange only the water purifying agents, at a bottle portion thereof. Thereby, only the water purifying agents can be exchanged.

Further, the cylindrical portion 6, the purifying portion 7, and the adjusting portion 8 may be constructed by constitutions respectively exchangeable in states filled with the water purifying agents. Thereby, only a member filled with a significantly consuming water purifying agent may be exchanged and even when a member is worn, all the members need not be exchanged.

Further, when there is constructed an integral constitution by the flange portion 1, the water charging and discharging mouth portion 2, the projected portions 3, and the neck portion 4, by using silicone members, it is not necessary to independently prepare the packing member made of silicone.

The respective aspects of the present invention are constructed by the above-described constitutions and therefore, the problem of the water storing type water purifier used by attaching to a bottle container and disclosed in JP '026, is resolved as follows.

There is constituted the flange member the diameter of which is substantially the same as the outer shape of the spout of the empty polyethylene terephthalate or PET bottle and which is provided with the thickness portion by which, even when the screw cap, inherently provided to the empty polyethylene terephthalate or PET bottle, is fitted to the thread portion of the empty polyethylene terephthalate or PET bottle, the flange member is screwed to fit thereto, in a water-tight manner, including the flange member and therefore, when the flange member is screwed to fit to the cap, inherently provided to the bottle container at the front end of the water purifier, there is not caused weakness in strength when the flange member is screwed to fit to the portion of the bottle container at the middle portion and the strength is high.

Further, by constituting the above-described structure, that is, there is not a structure portion matching with the screw structure of the empty polyethylene terephthalate or PET bottle and accordingly, there are not caused the problem of adhering dirt at the portion by forming a clearance of the screw structure inserted with the spout of the bottle and a problem in view of hygiene in which fur or mold is generated at the dirt and the structure is clean.

Further, there is constructed a simple structure in which in fixedly attaching the bottle container and the purifier, the purifier is inserted from the spout of the empty polyethylene terephthalate or PET bottle, the flange portion is mounted to an upper portion of the spout of the empty polyethylene terephthalate or PET bottle and the cap portion of the empty polyethylene terephthalate or PET bottle is closed along with the flange member. As a result, there is not caused the problem of fabrication owing to the complicated structure in which the flange portion is also screwed to fit to the thread portion of the spout of the bottle and an increase in the cost thereby, mass production is possible as a result of the simple structure, further, fabrication at a low cost is made possible.

Further, owing to the above-described constitution, there can be dispensed with time and labor of using the seat member formed at the lower portion of the screw structure by cutting thereof laboriously, which is present in the cap before unsealing thereof of the polyethylene terephthalate or PET bottle in recent times, the mounting time period is shortened and accordingly, there is achieved an effect of being capable of utilizing the invention simply even when a tool, such as a pincher or a nipper is not present at hand.

What is claimed is:

1. A water purifying cartridge for an empty polyethylene terephthalate or PET bottle comprising:

a flange member having a diameter substantially the same as an outer shape of a spout of the empty polyethylene terephthalate or PET bottle, the flange member having a thickness portion screwed to fit, in a water-tight manner, to an inner portion of a screw cap, when the screw cap, inherently provided to the empty polyethylene terephthalate or PET bottle, is fitted to a thread portion of the empty polyethylene terephthalate or PET bottle;

a water charging and discharging mouth portion opened to a substantially central portion of the flange member;

a hollow neck portion inserted to an inside of the spout of the empty polyethylene terephthalate or PET bottle successive to the flange member, the hollow neck portion having projected portions in a shape of a cross or a shape of a line brought into close contact with an inner diameter of the spout of the empty polyethylene terephthalate or PET bottle by a predetermined length;

a filter portion arranged right under the hollow neck portion;

an extractable and contractable adjusting portion filled with at least a first water purifying agent successive to the filter portion;

a cylindrical portion filled with at least a second water purifying agent successive to the extractable and contractable adjusting portion; and a water purifying portion which is filled with at least a third water purifying agent, the water purifying portion having an outer periphery provided with meshes or clearances for passing water therethrough.

2. The water purifying cartridge for the empty polyethylene terephthalate or PET bottle according to claim 1:

wherein the water purifying cartridge for the empty polyethylene terephthalate or PET bottle is attached to the empty polyethylene terephthalate or PET bottle by providing a packing member which is fitted, in a water-tight manner, to an inner diameter portion of the spout of the empty polyethylene terephthalate or PET bottle substantially in the same shape, the packing member having an inner portion which is fitted with a main body of the water purifying cartridge to the spout of the empty polyethylene terephthalate or PET bottle.

3. The water purifying cartridge for the empty polyethylene terephthalate or PET bottle according to claim 1:

wherein the extractable and contractable adjusting portion and the water purifying portion are each removable and the first and third water purifying agents, filled to inner portions of the extractable and contractable adjusting portion and the water purifying portion, respectively, are formed exchangeably.

4. The water purifying cartridge for an empty polyethylene terephthalate or PET bottle according to claim 3:

wherein a lower portion of the water purifying portion is formed by a removable lid structure for exchanging the third water purifying agent filled therein.

5. The water purifying cartridge for an empty polyethylene terephthalate or PET bottle according to claim 1:

wherein the extractable and contractable adjusting portion, the cylindrical portion, and the water purifying portion are all constituted exchangeably in a state so as to be filled with the first, second, and third water purifying agents, respectively.

* * * * *